March 8, 1966 E. RICHTER ETAL 3,238,979
CAN HANDLING AND FILLING APPARATUS
Filed Aug. 3, 1962 9 Sheets-Sheet 1
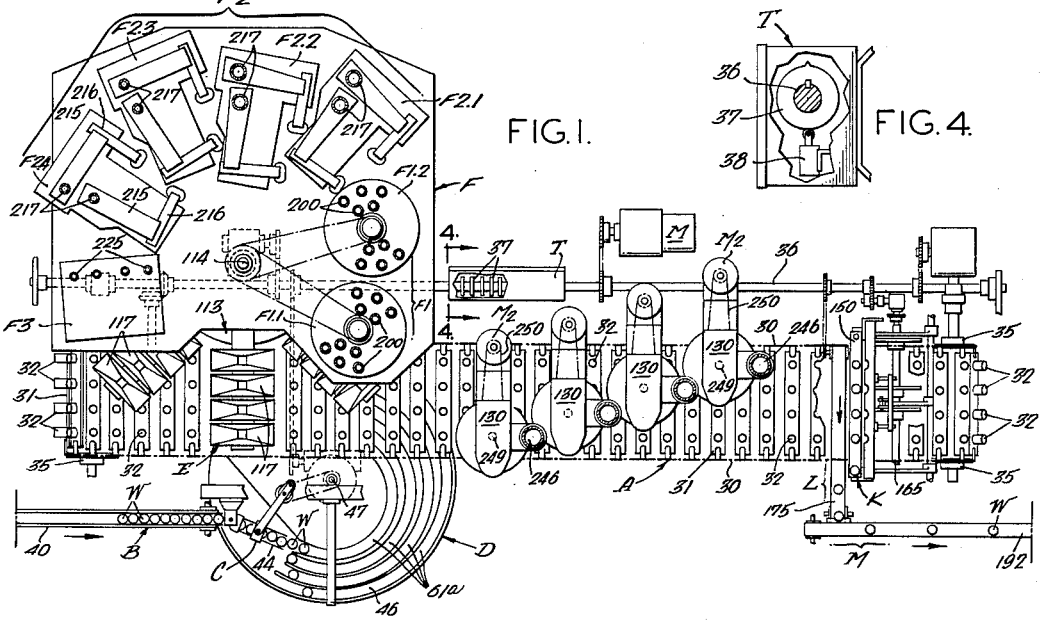
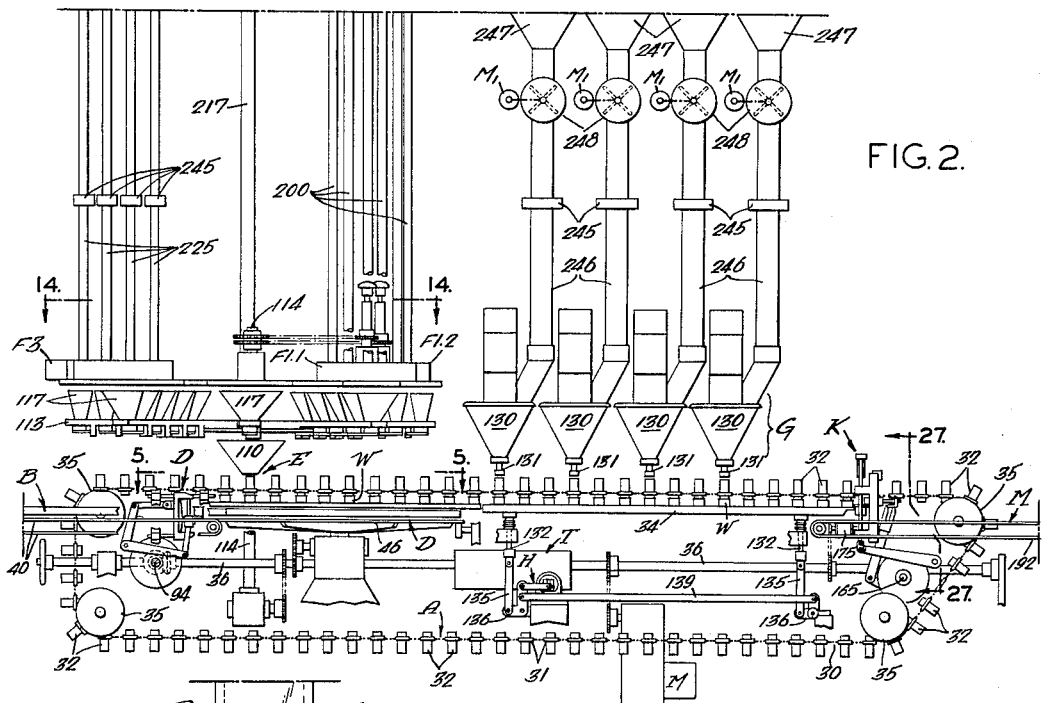
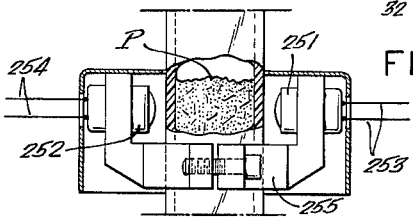
INVENTORS
ERNST RICHTER
KENNETH A. CLATFELTER
BY
Howson & Howson
ATTYS.

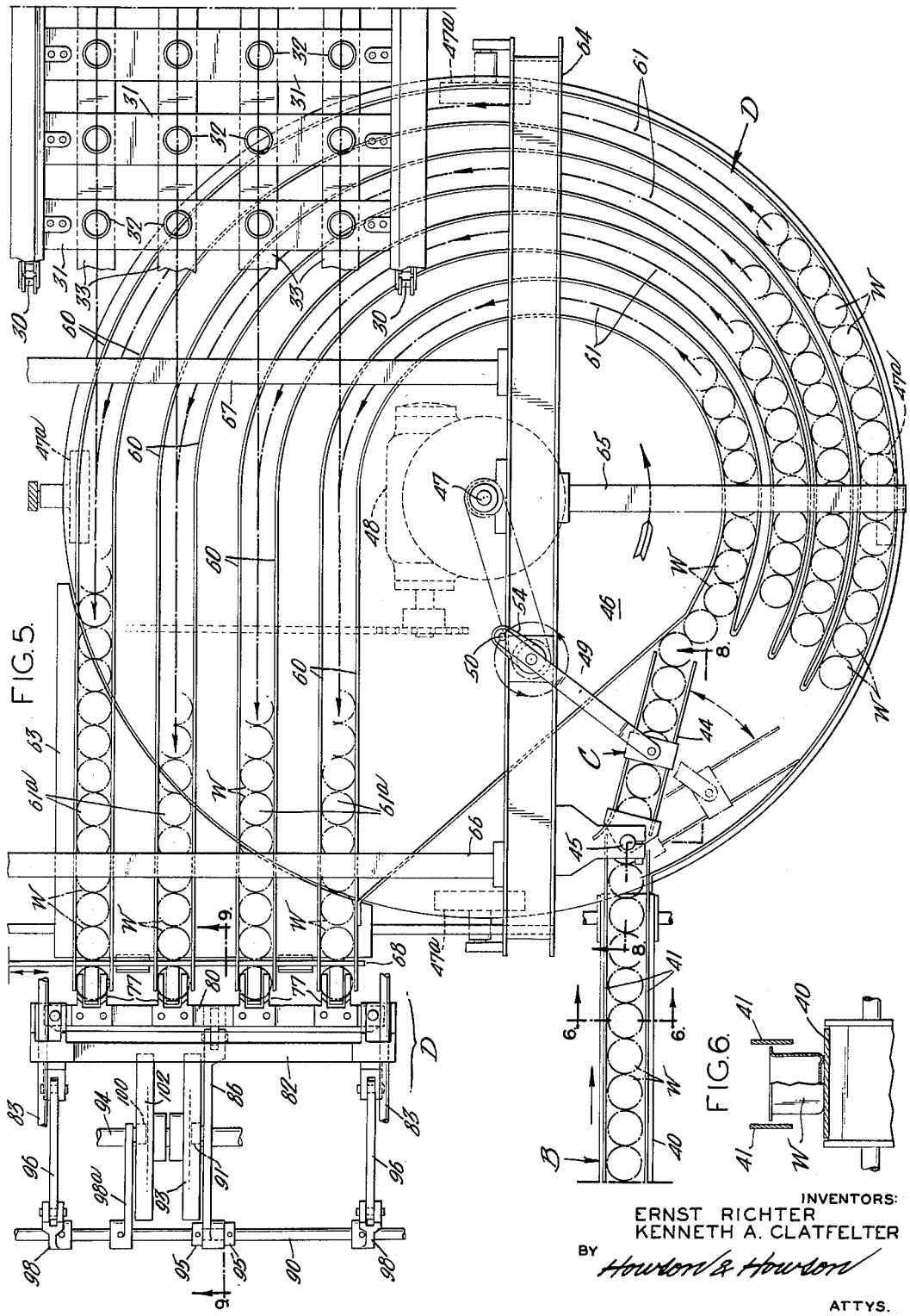

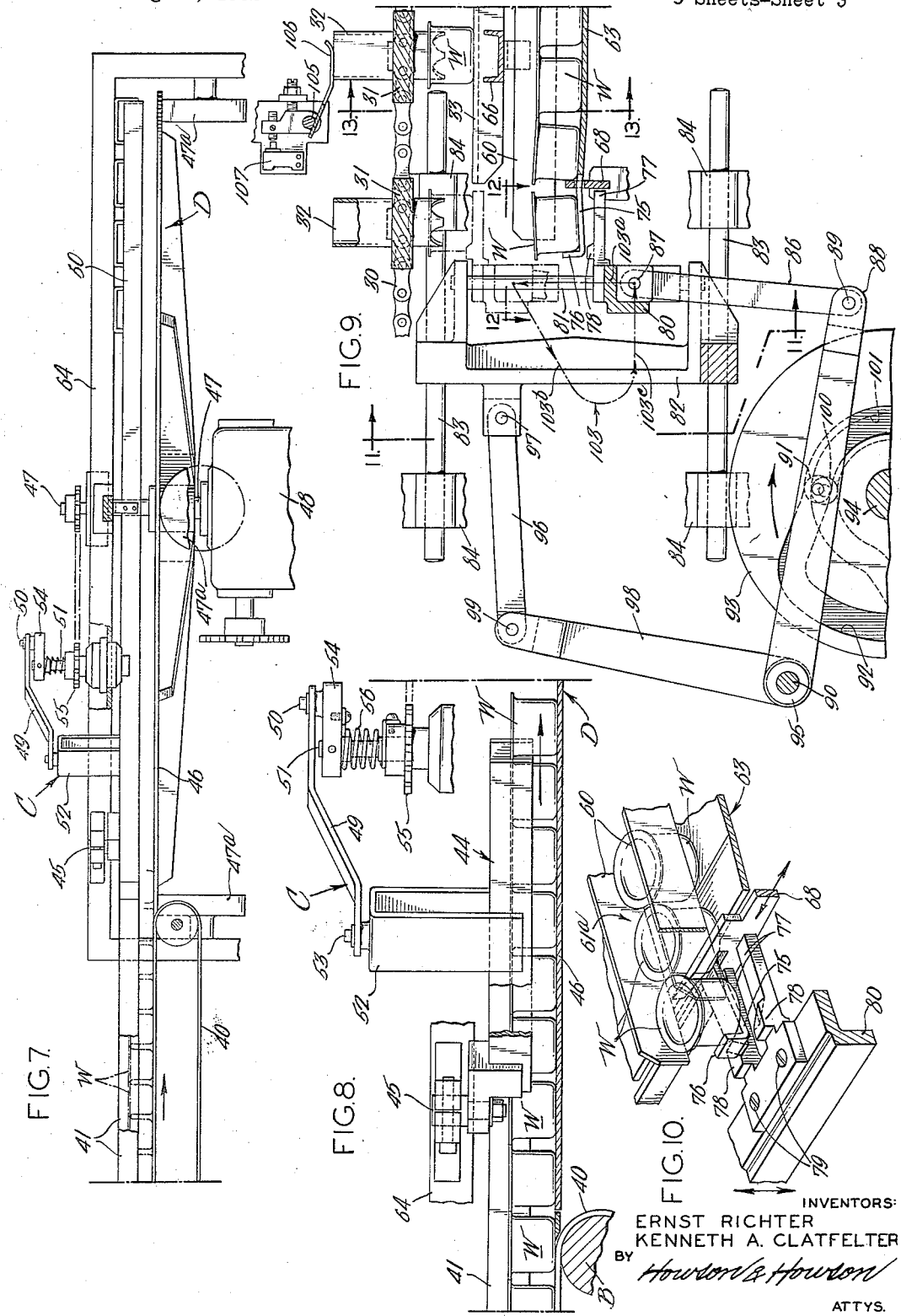

March 8, 1966  E. RICHTER ETAL  3,238,979
CAN HANDLING AND FILLING APPARATUS
Filed Aug. 3, 1962  9 Sheets-Sheet 4
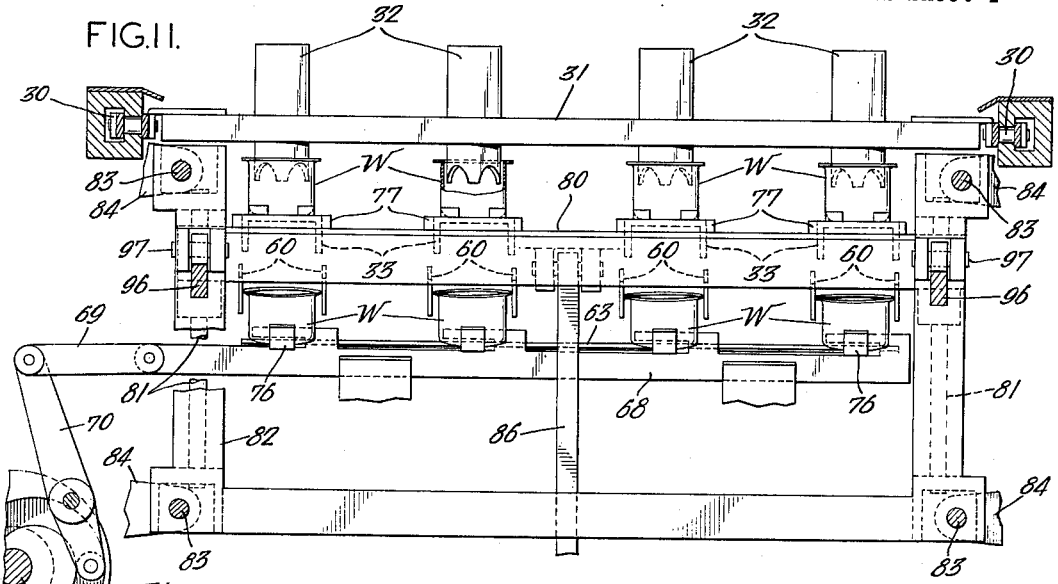
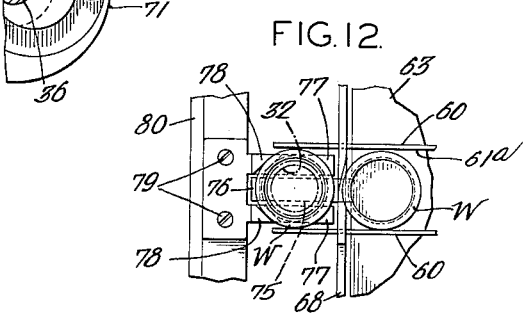
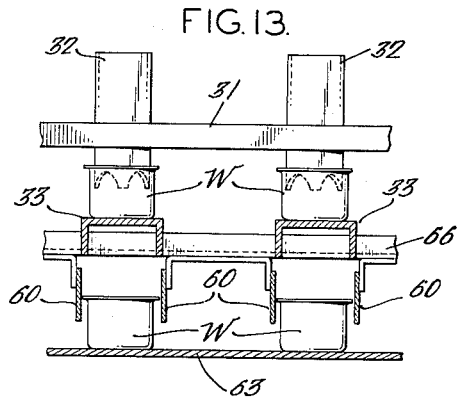
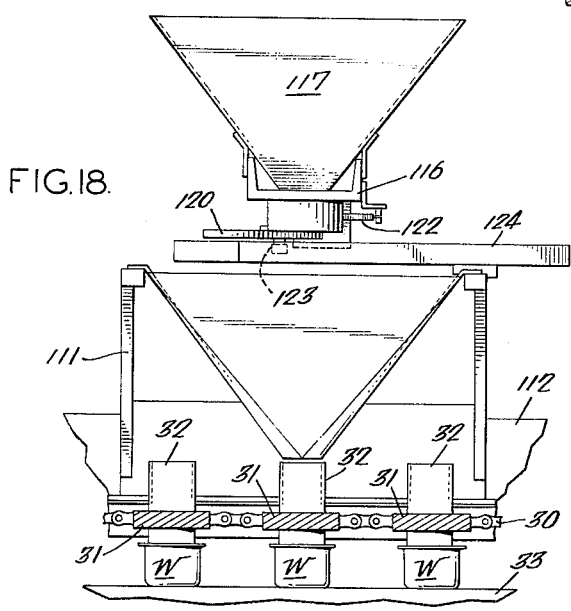
INVENTORS
ERNST RICHTER
KENNETH-A. CLATFELTER
BY Howson & Howson
ATTYS.

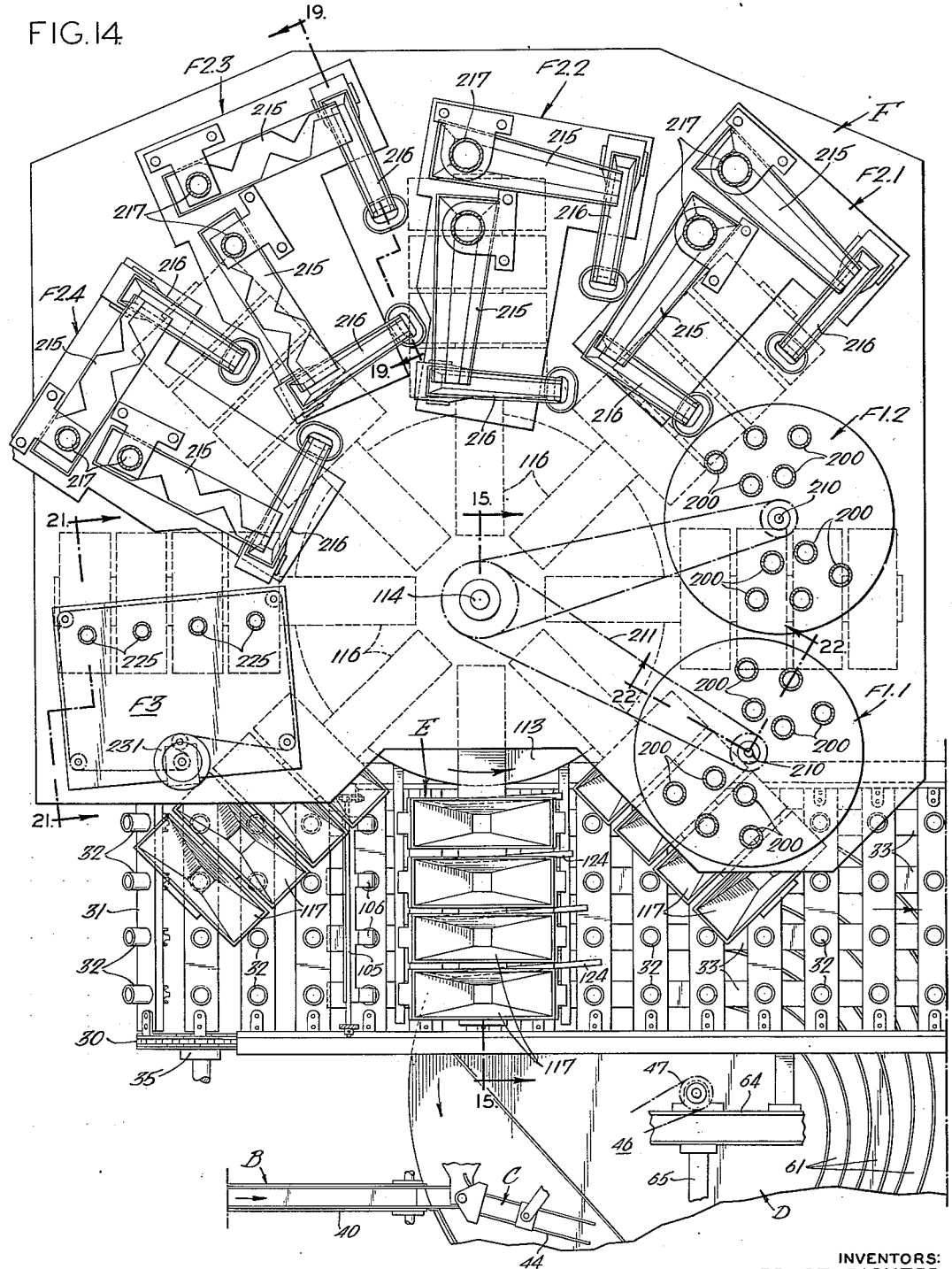

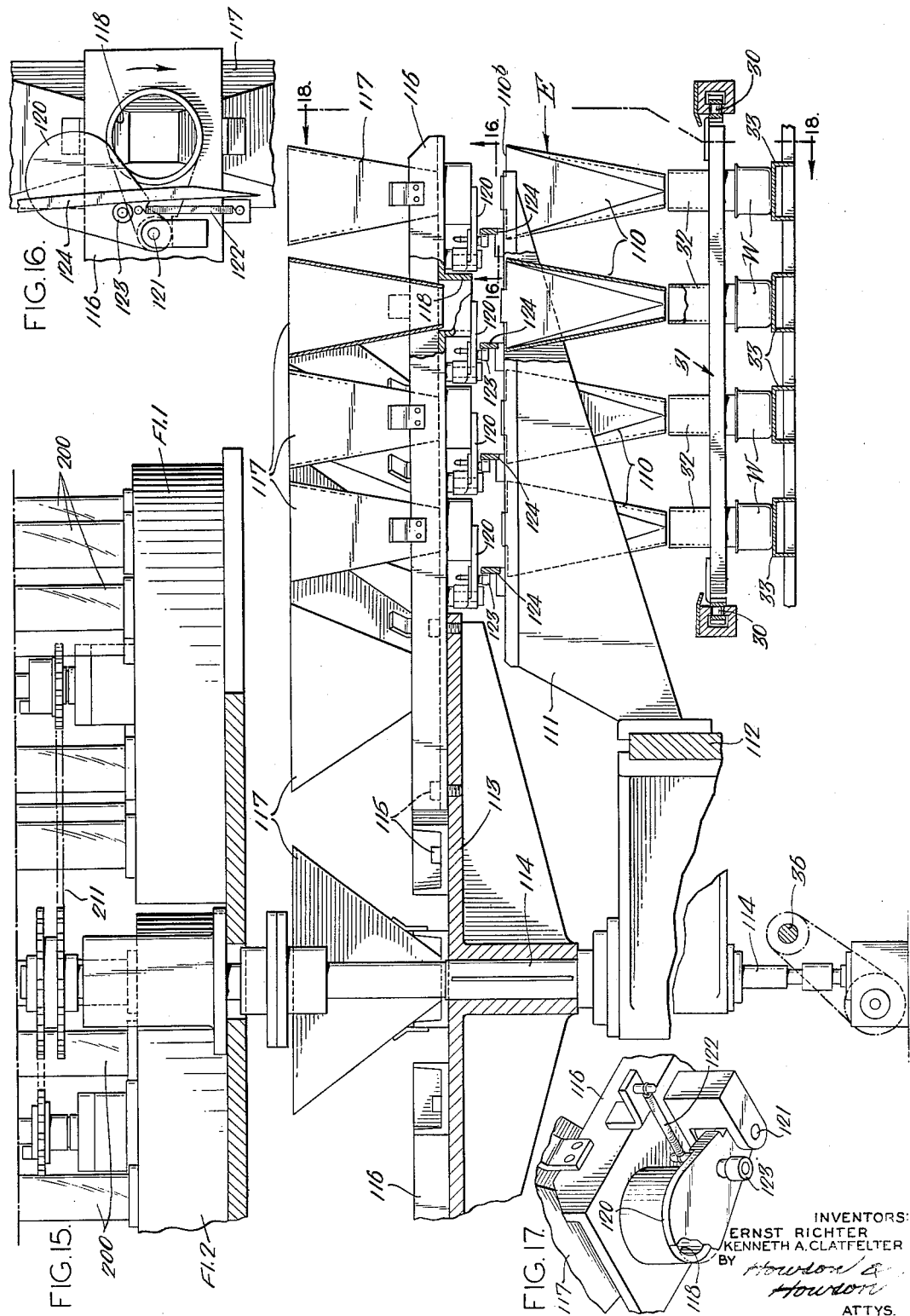

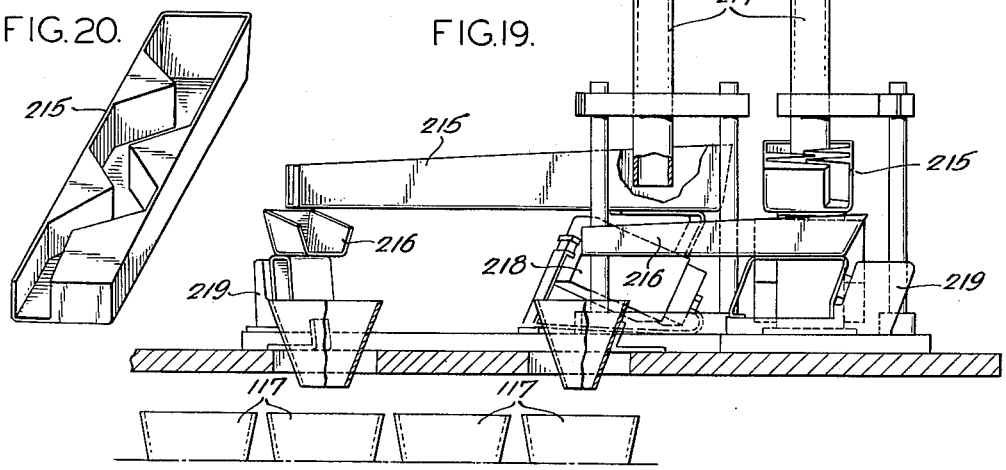
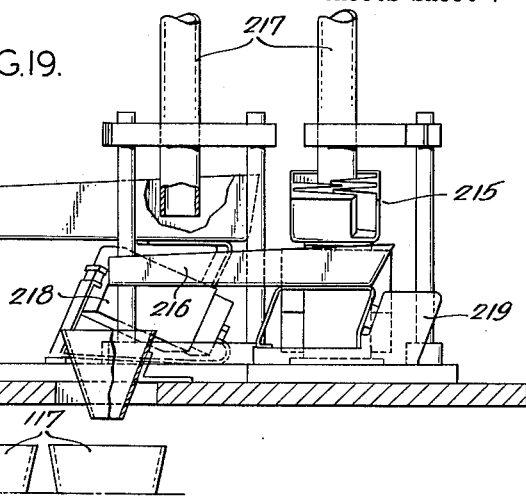
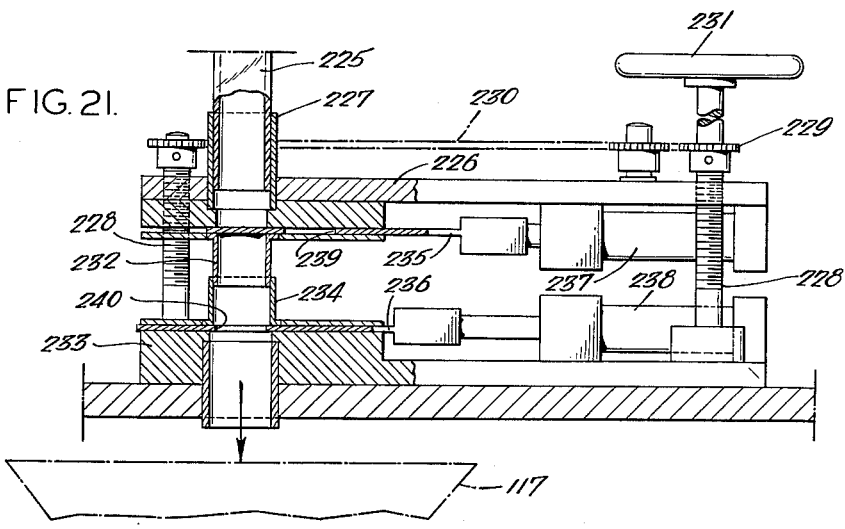
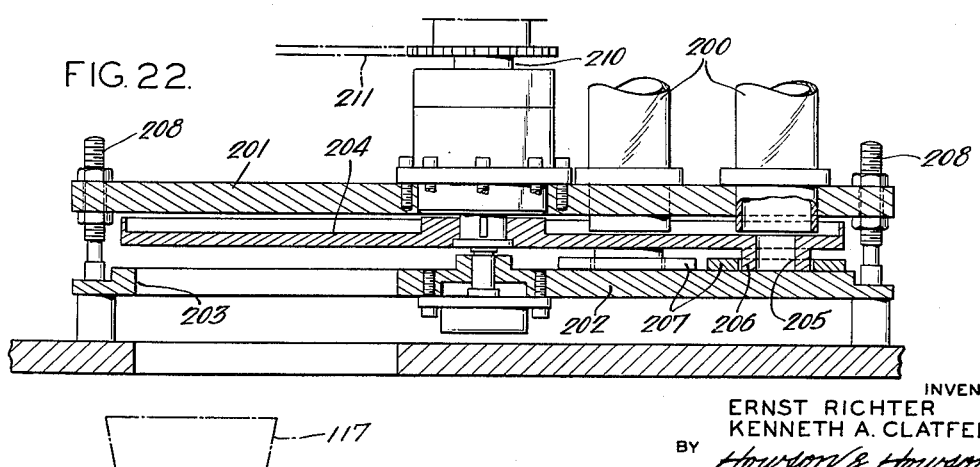
INVENTORS:
ERNST RICHTER
KENNETH A. CLATFELTER

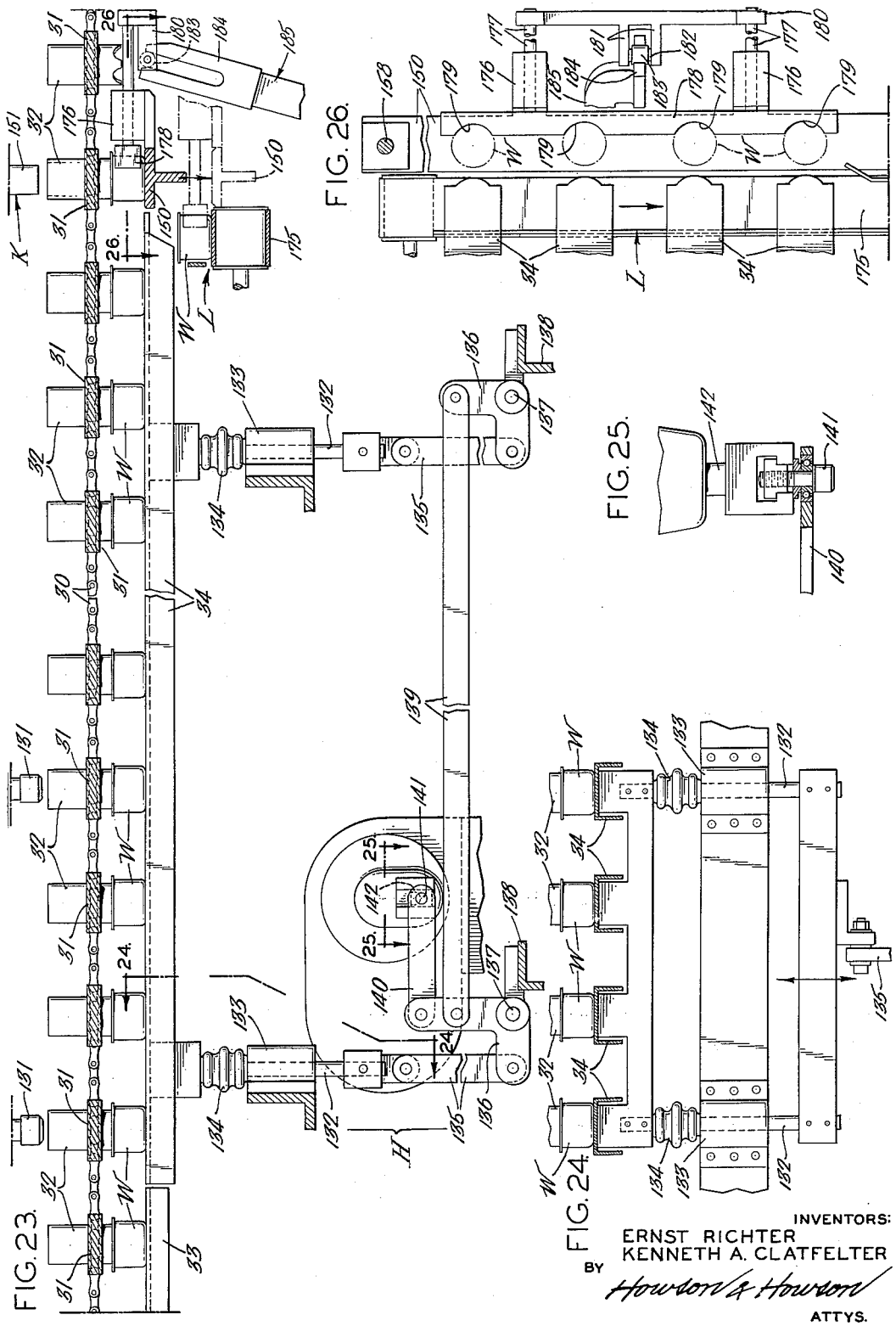

March 8, 1966 E. RICHTER ETAL 3,238,979
CAN HANDLING AND FILLING APPARATUS
Filed Aug. 3, 1962 9 Sheets-Sheet 9
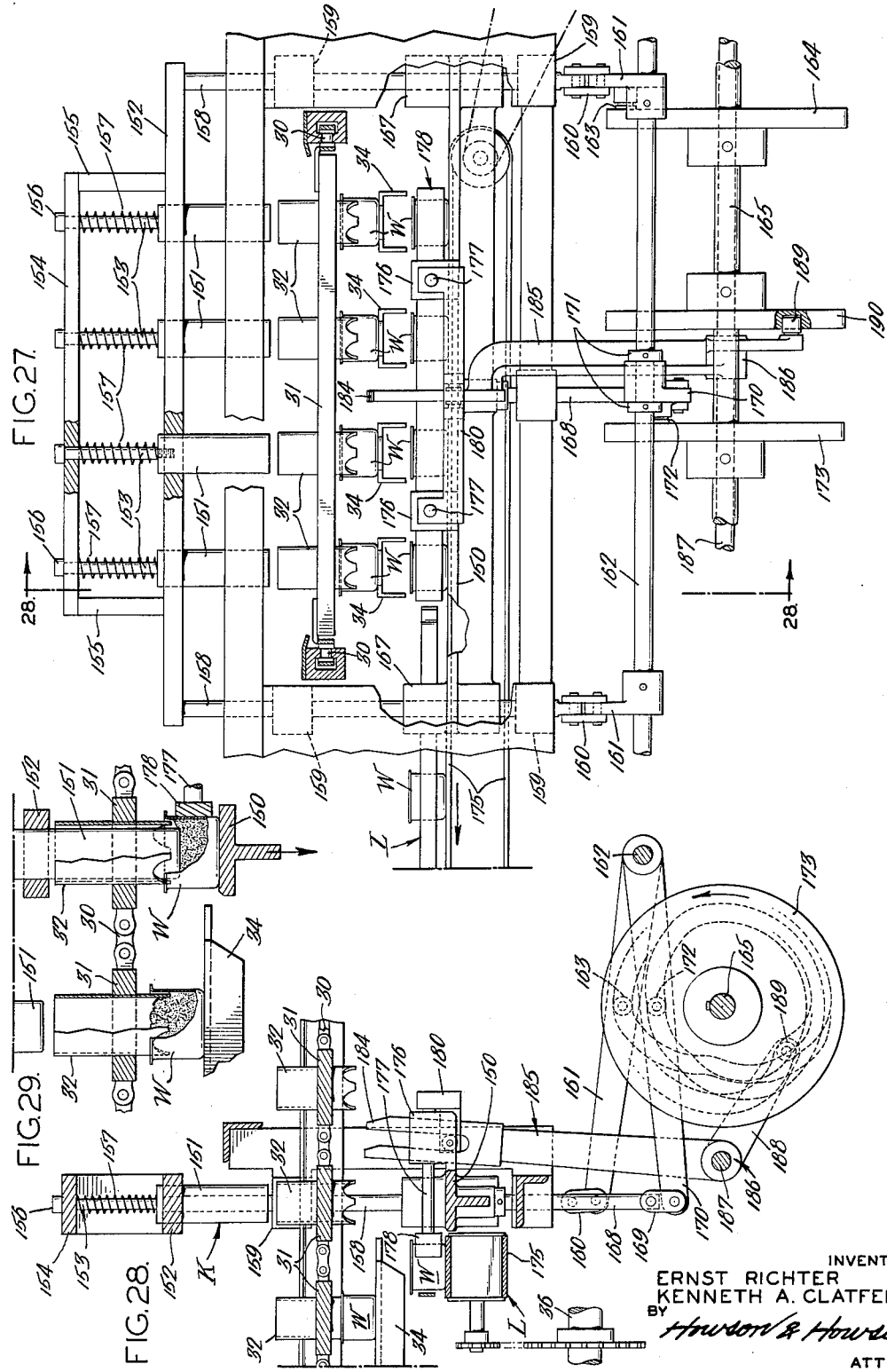
INVENTORS:
ERNST RICHTER
KENNETH A. CLATFELTER
BY Howson & Howson
ATTYS.

United States Patent Office 3,238,979
Patented Mar. 8, 1966

3,238,979
CAN HANDLING AND FILLING APPARATUS
Ernst Richter, Gloucester, and Kenneth A. Clatfelter, Moorestown, N.J., assignors to Campbell Soup Company, Camden, N.J., a corporation of New Jersey
Filed Aug. 3, 1962, Ser. No. 214,731
18 Claims. (Cl. 141—78)

This invention relates to can or container handling and filling apparatus, especially for handling dry materials, and has for an object the provision of can filling apparatus which operates at very high speed and with great precision and dependability.

The invention provides means for subdividing the containers or cans which are supplied in a single line or file into a plurality of lines or files for filling and for regrouping them after filling in a single line or file for subsequent operations.

The invention provides a turntable and fixed guide passageways for frictionally moving containers in a plurality of feed lanes.

The invention provides dispensing means for feeding the containers into position on transfer means for loading them on the conveying means.

The invention provides improved means for feeding accurately measured quantities of material where the material is of such a nature that the head of material in a feed tube materially affects the quantity delivered.

The invention also provides improved means for compacting the material in the containers, as by vibration or tamping or both, while the containers are being removed from the conveyor.

The invention also provides improved shaker feed means for the product.

The invention also provides means for holding the container conveying means in position and assuring that the parts are in proper position to clear the material feeding means.

The above and other objects as well as various features of novelty and advantages will be apparent from the following description of an exemplary embodiment of the invention, reference being made to the accompanying drawings, wherein:

FIG. 1 is a plan view of apparatus embodying the invention;
FIG. 2 is a side elevation of the apparatus shown in FIG. 1;
FIG. 3 is an enlarged vertical elevation and section of feed control means for a vertical feed tube shown in FIG. 2;
FIG. 4 is an enlarged vertical section of cam control mechanism, the view being taken on the line 4—4 of FIG. 1;
FIG. 5 is an enlarged plan view of the can distributing means shown in FIG. 1, the view being taken on the line 5—5 of FIG. 2;
FIG. 6 is an enlarged vertical transverse section taken on the line 6—6 of FIG. 5;
FIG. 7 is a side elevation of the apparatus shown in FIG. 5;
FIG. 8 is an enlarged partial vertical section taken on the line 8—8 of FIG. 5;
FIG. 9 is an enlarged partial vertical longitudinal section taken on the line 9—9 of FIG. 5, showing the can loading means;
FIG. 10 is an enlarged perspective view of some of the details shown in FIG. 9;
FIG. 11 is a transverse section and elevation of the can loading mechanism, the view being taken on the line 11—11 of FIG. 9;
FIG. 12 is a partial plan and section taken on the line 12—12 of FIG. 9;
FIG. 13 is a partial transverse vertical section taken on the line 13—13 of FIG. 9;
FIG. 14 is an enlarged plan view of product feeding and can filling mechanism shown in FIG. 1, the view being taken on the line 14—14 of FIG. 2;
FIG. 15 is an enlarged vertical transverse section taken on the line 15—15 of FIG. 14;
FIG. 16 is an enlarged bottom plan view taken on the line 16—16 of FIG. 15;
FIG. 17 is a bottom perspective view of the mechanism shown in FIG. 16;
FIG. 18 (on sheet with FIG. 11) is a transverse vertical section taken on the line 18—18 of FIG. 15;
FIG. 19 is an enlarged vertical section and elevation of the product feeding mechanism, the view being taken on the line 19—19 of FIG. 14;
FIG. 20 is an enlarged perspective view of a shaker trough shown in FIG. 19;
FIG. 21 is an enlarged vertical section of one product feeding means, the view being taken on the line 21—21 of FIG. 14;
FIG. 22 is an enlarged vertical section of another product feeding means, the view being taken on the line 22—22 of FIG. 14;
FIG. 23 is an enlarged and more detailed section and elevation of rail vibrating mechanism shown in FIG. 2;
FIG. 24 is a vertical transverse section taken on the line 24—24 of FIG. 23;
FIG. 25 is a horizontal section taken on the line 25—25 of FIG. 23;
FIG. 26 is a horizontal section taken on the line 26—26 of FIG. 23;
FIG. 27 is an enlarged vertical transverse section taken on the line 27—27 of FIG. 2;
FIG. 28 is a vertical section taken on the line 28—28 of FIG. 27; and
FIG. 29 is an enlarged vertical section like the right hand part of FIG. 23 but showing the parts in a different position.

In general, as shown in FIGS. 1 and 2, the apparatus comprises a main conveyor mechanism A for a plurality of rows of cans to be filled, a can supply conveyor mechanism B, can distributor mechanism C, can loading mechanism D, first can charging or filling mechanism E, product feeding or dispensing means F, second can charging or filling mechanism G, can vibrating mechanism H, product tamping or levelling mechanism K, can unloading mechanism L, and can offtake conveyor mechanism M.

The main conveyor mechanism A comprises an endless feed belt including on each side a drive chain 30 carrying crossbars 31 having can conveying tubes 32 (here four to a bar for four lines of cans), table plates or rails 33 (fixed) and 34 (vibratory) for supporting the cans during charging or filling, and belt supporting and driving sprockets all in general designated as 35. All of the mechanisms herein are driven by a main power drive shaft 36 and motor M but for simplicity, since the operational relationships will be apparent, the specific drive means from the main shaft for each mechanism will not be completely described in all cases. For illustration a cam timing box T with cams 37 and switches 38 are shown in FIGS. 1 and 4.

The can supply conveyor line B comprises a driven belt 40 operating between side guides 41 and carrying a single line of cans W which will be assumed to have been stamped with such record identifying and tracing indicia as may be desired.

The can distributor mechanism C comprises (FIGS. 5–8) a swingable distributor chute 44 hinged by a shaft 45 at the end of the conveyor belt 40 above the top of a large turntable 46 which is generally smooth on top but has enough friction with the bottoms of the cans to keep them moving unless they are held back. The turntable 46 rotates on a vertical shaft 47 and spaced rollers 47a and the shaft 47 is constantly driven, as by power gear drive means 48.

The chute 44 is constantly swung back and forth about its pivot axis shaft 45 by a connecting rod 49 operated by a crank pin 50 driven by a vertical shaft 51. A yoke bracket 52 carried by the chute has a pivot pin 53 for connection to the driving rod 49. In order to assure that cans will not be crushed by the swinging of the chute the crank arm 54 (FIG. 8) which carries the crank pin 50 and is carried by shaft 51 is driven by a sprocket 55 rotatable on the shaft through a torsion coil spring 56 or other suitable resilient means. Shaft 51 is turnably mounted in the upper end of a support therefor so that the drive between the shaft and sprocket is only through the torsion spring 56.

The can feeding means D includes the turntable 46 and a plurality of fixed guide rails or fences 60 defining four separate passageways 61 which follow around over the turntable until they become straight guide passageways 61a which are parallel with and directly beneath the paths of the can conveying tubes 32 of the main conveyor mechanism A.

The straight guide passageways 61a direct the cans off the turntable and out upon a fixed table or dead plate 63. The guide rails 60 may be supported from above by fixed bars 64, 65, 66, 67, and the passageways 61, 61a are preferably covered above the tops of the cans to prevent them from moving upwardly out of line. A transversely reciprocating escapement plate 68 with four openings, one for each line of cans, is provided near the ends of the passageways 61a to feed off four cans in tandem as required, the plate 68 closing immediately after each feeding movement to hold back the other cans of all rows against the frictional forward urge of the turntable. The escapement plate 68, as shown in FIG. 11, includes a connecting rod 69, and an operating lever 70 therefor, the lever being operated by a rotary cam 71 on the shaft 36.

*Can loading mechanism D*

The can loading mechanism D, FIGS. 5, 9–12, comprises a projecting ledge or finger 75 formed as an extension of the fixed table 63, one for each line of cans at the end of passageways 61a, beyond the escapement plate 68. Each finger 75 is bent down slightly at its outer end and has a turned up stop element 76.

The ledge or finger 75 is narrower than the width of the bottom of a can and for each ledge or finger 75 there are two elevator fingers 77, one for each side and both engageable with the bottom of a can. There are lugs 78 with tapered front ends on the fingers 77 to keep the cans in a forward position and to aid in keeping them centered.

All of the fingers 77 for the four rows of cans are secured at their anchor ends, as by screws 79, to an elevator bar 80 which is mounted for vertical sliding movement on guide rods 81 at its ends. The guide rods 81, in turn, are mounted on a slide frame 82 which is longitudinally slidable on horizontal guide rods 83 mounted in fixed frame anchorages 84.

The elevator bar 80 is reciprocated vertically by a link 86 which is pivoted to the bar 80 by a pin 87 at its upper end and pivoted to the end of a cam operated lever 88 by a pin 89 at its lower end. The lever 88 is turnably mounted at its other end between fixed collars 95 on a rock shaft 90 and intermediately carries a cam follower roller 91 which rides in the cam track 92 of a cam disk 93 mounted in a rotary shaft 94.

The slide frame 82 is reciprocated horizontally by links 96 which are pivoted to the frame by pins 97 at the forward end and pivoted to the ends of arms 98 by pins 99 at the rear end. The arms 98 are secured on the rock shaft 90 and a cam arm 98a also secured to the rock shaft 90 carries a cam follower roller 100 which rides in the cam track 101 of a cam disk 102 which is mounted on the rotary shaft 94.

This elevator mechanism is so designed that the can elevating fingers 77 during each cycle describe the curve 103 shown in broken lines with arrows in FIG. 9. The first movement is straight upward along the part of the path 103a to carry a can up from the fixed finger 75 and push its upper end into telescoping relationship with one of the tubes 32 of the main conveyor belt, which is halted in a fixed position to receive the cans. Specifically, the can fits over the tube and the tube is made irregular on its lower edge for easy removal from the can after it has been filled. The elevator fingers pause briefly at the upper end of the stroke while the main conveyor belt and the tubes 32 carried by it move forward to push the elevated cans forward so that their bottoms ride on the fixed table plates or support rails 33, as shown in FIG. 13.

After the cans have been fed off in the top position the elevator fingers 77 move rearward and downward along the part 103b of the path and then move forward along the horizontal part 103c of the path into a position to receive another group of cups to be raised.

The main conveyor belt describes a series of step-by-step stop-and-go movements, each step being of the same length as the distance between the crossbars 31 carrying the can conveying tubes 32, the tubes of a crossbar each time stopping accurately in position at the can loading station to have cans pushed therein by the elevator mechanism and other tubes stopping at other stations for other operations.

*First product charging mechanism E*

The first product charging mechanism E is shown in FIGS. 14–17. It includes a plurality of charging funnels 110, one for each can in the four rows, having lower ends 110a which are of a shape and size to deposit the product in the tubes 32 and thus in the cans which fit thereover as they are conveyed thereby. The conveyor belt is halted with the tubes and cans located accurately in charging position.

The upper ends 110b of the funnels are elongated longitudinally so as to receive product from supply means thereabove without requiring that the supply means be halted in its movement. The funnels are supported by a bracket 111 secured to a fixed frame part 112.

Directly ahead of the charging mechanism E there is provided a position checking device which includes (FIGS. 9, 14) a transverse rock shaft 105 having fingers 106, one for each conveyor tube 32 on the four conveyor belts, and if any one is too high to enter beneath the funnels 110 a signal is given at the control box 107 to halt the operation until the trouble is cleared.

For charging the funnels 110 there is provided a turning transfer wheel 113 mounted on a constantly rotating vertical shaft 114, the wheel having secured thereto, as by bolts 115, a plurality (here eight) of arms 116 each having mounted thereon a plurality (here four, one for each row of cans) of feed transfer hoppers 117 having large open top ends and small bottom ends with opening 118 controlled by dispensing mechanism.

The dispensing mechanism for the opening in the lower end of each hopper includes a closure plate 120 hinged on a vertical pivot pin 121 adjacent the bottom opening of a hopper. A coil spring 122 or other suitable means constantly urges the closure plate in a direction to cover the bottom opening 118. The plate carries on its lower side a pin-roller cam follower 123 which, when the hopper comes over the elongated upper end 110b of a funnel, engages the side of a cam track 124 fixed above and alongside the top of a funnel to cause the closure to open and allow the contents of the hopper to flow down into the funnel.

The feeding means for supplying product of the desired kind in the desired amount may be of various kinds and may supply one or more product ingredients selectively separately or together. The description of this feeding mechanism will be deferred until later in order to permit the major operations along the main feed belt to be followed.

Second can charging mechanism G

The second can charging mechanism G comprises a plurality of charging cones 130 arranged at different points longitudinally of the main conveyor belt for different rows of cans, this arrangement providing greater space for the mechanism. Each charging cone 130 has a spout 131 arranged above a can when the main conveyor belt is stopped.

Rail vibrating mechanism H

For the final charging operations the rails are vibrated vertically by the mechanism H to compact and even up the product, the cans at this time resting on the vibratory plates or rails 34. As shown in FIGS. 2, 23–25, the rails 34 are vibrated by vertical reciprocatory rods 132 slidable in fixed guides 133, resilient elements 134 supporting the rails on the tops of the guides 133. The resilient elements are preferably combination rubber and metal coil springs. Links 135 with upper and lower pivot connections drive the rods from bellcrank levers 136 pivoted by pins 137 on fixed supports 138. A link 139 pivoted at its ends connects the bellcrank levers together. A drive link 140 pivoted at its ends to one of the bellcrank levers and adjustably connected to a crank arm or eccentric 141 of a driving shaft 142 provides the vibratory movement.

Tamping mechanism K and unloading elevator mechanism L

The tamping mechanism K and the can unloading mechanism L are shown on the right hand side of FIG. 23 and in FIGS. 26–29.

After they have been filled the cans move off the ends of the rails 34 and stop upon a transverse elevator plate 150 when the main conveyor makes a stop. While the cups are so halted a gang of plungers 151, one for each can of the four rows, descends into the tubes 32 and on down into the cans to compact and level the material therein. The tamping plungers 151 are guided by a cross bar 152 and support rods 153 carried by the plungers are guided by an upper cross bar 154 mounted on the lower bar by spacers 155. The rods have heads 156 to hold them and the plungers up. Springs 157 disposed around the rods 153 between the upper ends of the plungers and the cross bar 154 allow the plungers to move up yieldingly.

The cross bars 152 and 154 and the plunger assemblies carried thereby are mounted on vertical support slide rods 158 carried in fixed guides 159. The support rods 158 are operated by links 160 pivoted thereto and pivoted to the outer ends of cam levers 161 mounted rigidly on a rock shaft 162. One of the levers 161 is provided with a cam follower roller 163 operated by a cam plate 164 carried by a rotary shaft 165.

The elevator plate 150 at its ends is provided with guides 167 which are slidably mounted on the rods 158 and the plate is operated by a rod 168 connected thereto near the middle, the rod 168 having pivoted thereto a link 169 which at the lower end is pivoted to the outer end of a cam lever 170 turnably mounted on the rock shaft 162 between collars 171 secured to the shaft. The lever 170 carries a cam follower roller 172 which is operated by a cam plate 173 carried on the rotary shaft 165.

As shown in FIG. 29, the tamping plungers 151, after compacting the material in the cans, follow the cans down with the elevator plate 150 until the cans have been pushed off the lower ends of the conveyor tubes 32, the plungers then quickly retracting upward so the conveyor belt can move forward.

The elevator plate 150 continues to move downward until the can bottoms (FIG. 28) are level with a transverse offtake conveyor belt 175 comprising part of the offtake conveyor mechanism M.

Means are provided for pushing the cans off the elevator plate 150 and upon the belt 175 when they are even therewith. As shown, the plate 150 is provided with rigid longitudinal guides 176 on the forward side in which operate slide rods 177 which carry a pusher plate 178 having arcuate notches 179 for engaging the sides of the cans.

At their forward ends the slide rods 177 have rigidly secured thereto an operating bar 180 which at the middle is provided with brackets 181 carrying between them a pin 182 carrying a roller 183. The roller 183 is engaged by the bifurcated end 184 of an upstanding arm 185 of a bellcrank lever 186 mounted on a rock shaft 187. The other arm 188 of the bellcrank lever 186 is provided with a cam follower roller 189 which is operated by a cam plate 190 fast on the rotating shaft 165.

This arrangement provides free vertical movements of the can pusher plate with the elevator plate while permitting the bifurcated end of the bellcrank lever to be in position to operate it when needed.

Offtake conveyor mechanism M

The offtake conveyor mechanism, in adidtion to the transverse conveyor belt 175 already described, includes (FIG. 1) a final longitudinal offtake conveyor belt 192 which takes the cans from the belt 175 and conveys them to inspection, capping or other facilities as needed.

Product feeding mechanism F

Returning to the feeding mechanism F of FIGS. 1–3 and 14–18, it has been seen that the hoppers 117 of the turning wheel 113 deposit material in the charging funnels 110 in passing, the wheel and hoppers turning continuously at a constant speed. At other places around their circular path the hoppers receive material from suitable material feeding means disposed thereabove. There are a plurality of feeding means for feeding a plurality of different materials around the circle. Preferably the feeding means will vary in character for feeding different kinds of materials. The apparatus can then run selectively on any desired material or, by adjusting the amount of feed, can run on a mixture of all of the materials, some of each being fed.

As shown in FIGS. 1 and 14, there are three different types of feeding mechanisms for feeding three or more different kinds of materials. Following the direction of turning of the wheel 113, as shown by the arrow in FIG. 14, there is a first feeder type F1 comprising two units F1.1 and F1.2, then a second type feeder F2 comprising four units F2.1, F2.2, F2.3, and F2.4, and after that a third type feeder F3 comprising a single unit.

First type feeding means F1

The first type of feeding means F1 is shown in more detail in FIGS. 14 and 22. This is a controlled volumetric feed in which a plurality of feed tubes 200 receive material from a supply source above (not shown) and direct it to a fixed dispenser plate 201 located at a distance above a fixed bottom plate 202 having an opening 203 on one side to supply on this side two hoppers of each group of four, the radially inner two. Other tubes and openings on the other side supply the other two hoppers. Between the plates 201 and 202 there is a rotatable dispensing plate 204 having a plurality of holes 205 therethrough adapted to pass under the open lower ends of feed tubes 200. The holes 205 have tubular projections 206 below the body of the plate 204 and a ring 207 loosely surrounds each projection and rests on the lower plate 202. The lower plate 202 can be adjusted up and down by the supporting adjustment bolts 208 and when the lower plate is lowered below the position of FIG. 22 the content of the hole is increased. The openings 203, of course, will be suitably formed to prevent the rings 207 from falling down when the material is discharged into the hoppers.

The rotary plate 204 is mounted on a vertical shaft 210 driven by a sprocket chain 211, as from the central shaft 114. The holes 205 are arranged on different radii and the feed tubes 200 are arranged in groups on the same radii. As shown, there are three pipes for each group for the outer radius and two tubes for each group on the inner radius. The reason for having a greater number of tubes at the longer radius is that the dispensing holes sweep past faster and need more fill tubes to supply the same amount of material as would be supplied by fewer tubes on the smaller radius where the sweep time past a tube opening is greater.

The two units, each with two groups of five supply pipes, give enough charges to each and all four hoppers in passing to fill the four cans to be charged at one time and with a different material at each unit if wanted.

*Second type of feed means F2*

The second type of feeding means F2 employs vibratory feeding mechanism. Each of the units F2.1, F2.2, F2.3 and F2.4 supplies two hoppers and two units will supply one unit of material to each of the four hoppers. A description of the one unit shown in FIGS. 14, 19 and 20 will serve for all. Actually, because of space economy, the units each supply two hoppers but at radially staggered spaces. Thus the unit F2.1 supplies the radially outer hopper, called #4, and the alternate inner hopper, or #2; and the unit F2.2 supplies #3 and #1. The units F2.3 and F2.4 supply another increment of material to each hopper in like manner as units F2.1 and F2.2 supplied the first increment. Thus unit F2.3 will supply #4 and #2 and the unit F2.4 will supply #3 and #1.

Each unit is divided into two sub-units, each having two successive vibrating zig-zag troughs 215, 216. The first or upper trough 215 receives material from a feed tube 217 and vibrates continuously, as by an attached vibrator unit 218. The second or lower trough 216 receives material from the upper trough 215 and vibrates intermittently, as by an attached vibrator unit 219, to deliver material only when a hopper is located thereunder. The zig-zag trough arrangement is shown in FIG. 20.

The orientation of the troughs can be seen in FIGS. 1 and 14. For unit F2.1 the upper trough 215 is generally tangential and the lower trough 216 is generally radial; whereas for unit F2.2 the upper trough 215 is radial and the lower trough 216 is tangential, in all cases the axis of the turning wheel carrying the hoppers being the point of circle reference used.

*Third type feeding means F3*

The third type of feeding means F3 employs the alternate gate plate type of dispenser, as shown in FIGS. 1, 14 and 21. Here a plurality of feed tubes 225 feed material down from a suitable supply source (not shown) to an upper plate 226 having vertical adjustment to vary the feeding capacity for each feeding increment. The plate has a sleeve 227 slidably fitting on each tube 225. The plate is raised and lowered by a plurality of threaded shafts 228 having sprockets 229 for a sprocket chain 230 and one of the shafts is provided with a hand wheel 231 for turning all of the shafts together.

The upper plate 226 carries a measuring tube element 232 and a lower fixed plate 233 carries a mating larger telescopic tube element 234 slidably fitting on the tube element 232. Each plate 226 and 233 carries separate dispensing blades 235 and 236 respectively which are operated by power means 237, 238 but in alternate positions of the openings 239, 240 of the respective blades. Both blades, or at least the lower one, open and close while a trough arm is located therebelow, first the upper blade opening to fill the dispensing tube between blades and then closing and thereafter the lower blade opening to discharge the material to a hopper and then closing.

With a volumetric device of this kind it is important to maintain a constant length of column or head of material above the dispensing means at all times. For this purpose (FIG. 2) a height control device 245 is provided on each tube to control the mechanism thereabove for feeding down material to keep the head constant. This head control is like that of the charging and feeding mechanism G which is shown in more detail and that will be described instead of this.

*Feeding mechanism G*

It has already been noted in connection with FIGS. 1 and 2 how the charging cones 130 feed through spouts 131 into cans when halted thereat. The feed-down means in the cones is of a known screw type in which each turn of the screw shaft feeds down a measured amount of material. Means are hereby provided for giving these units a certain selected number of turns for each charging operation while the cans are halted and stopping the feeding action while the cans are moving.

Feed tubes 246 supply material to the cones 130, as from supply bins 247 thereabove. Feed-down means 248 of the paddle type driven by a motor M1 controls the amount of feed. The feed means in the cones, each with a shaft 249, is driven by a sprocket chain 250 from a controlled power device which may be a clutch from a main drive or, as shown for simplicity, a motor M2.

The accuracy of feed of the mechanism G is affected by the height of material in the tubes 246. For keeping the height of material or head in the tubes constant each is provided with a height control device 245 previously mentioned. A simple form of height control device is the electronic eye shown in FIG. 3. Preferably all feed tubes of the whole apparatus are transparent, as of a transparent plastic such as "Lucite" or "Plexiglas," and the beam of a lamp 251 energizes a light-sensitive unit 252 when the opaque powdered product P stands above the sight line between lamp 251 and the light responsive unit 252, as it does in FIG. 3. The lamp is energized by power conductors 253 and the unit 252 is connected to the motor M1 by conductors 254. The whole level control unit can be mounted at adjustable heights on the feed tube by a clamp mounting 255. There will be some latitude in the change of height of material between actions of the height control device in known manner so that the action need not be continuous, that is, so there will be some latitude in the length of the on-off feed-down action. Since the paddle feed is volumetric there can be a given number of turns for each feeding, the eye causing feeding each time the material in the beam line disappears.

*Operation*

In operation, the motor M is started to turn the main shaft 36. This starts the step by step movement of the main conveyor belt, sets the turntable 46 into continuous movement, and through either direct coordinated mechanism, timing controls T or demand controls, causes operation of all associated apparatus.

As the turntable turns and as cans are continuously supplied in single file by the can supply belt 40, the swingable chute spreads the cans in front of the four passageways 61 so as to keep these passageways full of cans. The rate of feed of cans by the belt 40 is kept equal to the rate of filling of cans by the principal apparatus.

The turntable frictionally carries the cans through the passageways or lanes 61 around the wheel and back through the straight passageway portions 61a onto the table or dead plate 63 and against the escapement plate or gate 68.

The escapement plate 68 releases four cans at a time, one from each passageway 61a, out upon the fixed fingers 75, the cans stopping against the turned up stop elements 76.

The elevator fingers 77 engage the can bottoms alongside the fingers 75 and move the cans upward and since the main conveyor belt is halted at this time the open upper ends of the cans are forced on the lower ends of the conveying and filling tubes 32 which are carried by the main conveyor belt.

While the cans are still held upward by the elevator fingers 77 on bar 80 the conveyor belt moves forward and the tubes 32 move the cans forward on the rails 33.

If any one of the four cans should not be fed in properly so that any one of the conveyor tubes should stand too high to enter beneath the charging funnel, the finger 106 on shaft 105 would provide a signal at control box 107 to stop the machine.

At the first charging station E the cans each receive a first charge of material or product P from the four charging funnels 110 which, at the time a group of cans is halted therebelow, receive each a charge of material from the four hoppers 117 of one of the eight arms of the turning wheel 113.

The hoppers 117 have previously been supplied with the proper amount of material from one or more of the feeding units F1, F2 and F3 which are arranged around and above the turning wheel. The provision of a plurality of different feeding units, each of variable capacity, provides for operating on various products and mixtures selectively at different times. Besides, the material at the supply sources above can be changed as desired.

For example, but without imposing any restriction, let it be considered that the unit F1.1 supplies the four hoppers with one kind of dried garnish; that the unit F1.2 supplies another kind of dried garnish; that the units F2.1 and F2.2 supply four hoppers with dried diced meats; that the units F2.3 and F2.4 supply four hoppers with dried diced vegetables; and that the unit F3 supplies four hoppers with dried noodles.

The feeding devices at station G may directly supply to cans halted at the second charging station a dried base. As noted, the cans rest on the vibrating rails 34 for the final filling operation.

After filling, the cans are stopped on the discharge elevator bar 150 and the material is levelled and compacted by the plungers 151, the plungers moving down with the cans on the elevator to assure their clearance from the feed tubes 32. The irregular shape of the lower end of the feed tubes assures their easy removal from the material in the cans without pulling material out of the cans.

The elevator continues down until the cans are level with the transverse offtake belt 175, whereupon the bar 178 with notches 179 embracing the cans is moved rearward to push the cans off upon the belt.

Here the cans are again in single file and are transferred to the longitudinal offtake belt 192 where they continue to move in single file in capping mechanism, weighing mechanism, labeling mechanism and the like.

Although it cannot be conveniently illustrated, the entire machine is preferably kept in a moisture and temperature conditioned room and the machine is preferably enclosed in a gas tight enclosure charged with a protecting atmosphere, such as nitrogen or whatever is compatible with the product, the enclosure including adequate transparent wall space for full inspection and adequate closures for necessary access for servicing and repair.

It is thus seen that the invention provides convenient and efficient means for automatically supplying cans in single file, dividing them into plural rows, moving and dispensing them to an elevator which transfers them to a main conveyor, checking the position of the conveyor means prior to filling them, vibrating them, and compacting and leveling material in them prior to discharging them for delivery in single file. The invention also provides certain improvements in the material feeding means.

While one embodiment of the invention has been described for purposes of illustration it is to be understood that there may be various embodiments and modifications within the general scope of the invention.

We claim:

1. Container filling apparatus, comprising in combination, a conveyor, a plurality of tubes open at both ends carried by the conveyor, each tube being of a size to telescope with and closely fit inside a container and entraining the container to move it along, means at a fixed position along the conveyor path of travel for pushing containers up into telescoping relationship with said tubes, container supporting table rail means located beneath a length of the conveyor on which the containers rest as they are moved along by said tubes, and means for vibrating said table rail means at a location along its length for settling material in the containers while telescoped with said tubes.

2. Container filling apparatus as set forth in claim 1, further characterized by the fact that the lowers ends of said tubes which closely fit inside the containers are of irregular shape to avoid jamming in the containers and to prevent disruption of the material in the containers when the containers are separated from the tubes.

3. Container filling apparatus as set forth in claim 1, further characterized by the fact that a tamper is mounted at a fixed position along the path of travel of said conveyor, said tamper having a downward movement to compress material in said containers and push the containers downward out of said tubes upon container removing means.

4. Container handling apparatus, comprising in combination, a conveyor line supplying a single file or line of containers to its delivery end, a turntable disposed below and adjacent the end of the conveyor, a plurality of fixed guides disposed above said turntable providing lanes with their open receiving ends disposed adjacent the delivery end of said conveyor line, and a swingable member movable over the receiving ends of said lanes for distributing containers from said one conveyor line to all of said lanes.

5. Container handling apparatus as set forth in claim 4, in which said guides extend around said turntable to present the delivery ends of the lanes at a point which is angularly removed from their receiving ends.

6. Container handling apparatus as set forth in claim 5, which further includes a main container conveyor movable past the delivery end of said lanes but traveling in a direction opposite to that of the containers at the delivery end of the lanes.

7. Container handling apparatus as set forth in claim 5, which further includes a container conveyor movable past the delivery end of said lanes, transfer means for feeding containers from said lanes to said conveyor, and a multiple escapement device for delivering containers from all of said lanes to said elevator.

8. Container handling apparatus as set forth in claim 5, which further includes a fixed table beneath said conveyor at the level of the turntable, and means for holding and guiding containers pushed off said turntable in position to be fed to said transfer means, the turntable providing the push for lines of containers on said fixed table, and escapement means for containers from the guide lanes to said transfer means.

9. Container filling apparatus, comprising in combination, a conveyor carrying container filling and moving tubes traveling to a container offtake station and there stopping for the removal of containers, an elevator memmer supporting containers telescoped with tubes at the offtake station, and a container tamping and leveling means acting through a tube at the offtake station.

10. Container filling apparatus as set forth in claim 9, in which said container tamping and leveling means moves down with the container as it moves down with the elevator member and moves back up out of the tube before the conveyor belt moves forward.

11. Container filling apparatus, comprising in combination, a belt carrying a container to be filled, and material dispensing means for dispensing a batch of material to be deposited in said container, said dispensing means including a rotary disk carrying a material receiving pocket, and a plurality of circumferentially spaced fill tubes on the same radius as said pocket for delivering a plurality of increments of material to said pocket in passing.

12. Container filling apparatus as set forth in claim 11, in which said rotary disk is provided with material receiving pockets located at different radial distances from the axes and in which a greater number of fill tubes is provided for a pocket located at a greater radius than is provided for pocket located at a shorter radius, whereby to compensate for different speeds of circumferential travel of pockets at different radial locations.

13. Container filling apparatus, comprising in combination, a pair of spaced driven belts, a plurality of rigid cross bars secured at their ends to said belts, each cross bar having a plurality of open ended container conveying tubes secured thereon, means for inserting containers over the bottom open ends of the tubes, leaving the open upper ends for feeding down material through the tubes into the containers, and longitudinal supporting table means arranged below the bottoms of the containers in their path of travel with said tubes to support them while being filled.

14. Container filling apparatus as set forth in claim 13, which includes container filling means located closely above the path of travel of said containers along said supporting table means, and feeler means located ahead of said filling means but above said supporting means to indicate the jamming of a container beneath a bar or tube on said supporting means.

15. Container filling apparatus as set forth in claim 14, in which said feeler means includes a feeler finger disposed above and adapted to contact the upper end of each tube on a bar, and a rock shaft carrying all of said feeler fingers.

16. Container handling and filling apparatus for cup-shaped containers, comprising in combination, an endless belt having an upper operating span and a spaced lower return span, said belt carrying at least one line of tubular open-ended container filling and conveying tubes, a longitudinal table disposed below the path of travel of said tubes along the upper span of the belt to support the tubes while being filled, there being open space at the ends of the table for elevating containers at one end and lowering containers at the other end, means for elevating containers over the tubes when stopped adjacent one end of the table, the elevating means holding a container until the belt and the tube moves to carry the container upon the table, means along the conveyor above the table for feeding material into containers when halted, and means at the other end of the table for lowering a container down off of a tube while the belt is halted.

17. Apparatus as set forth in claim 16, which further includes a container supply device beneath the upper span of the belt which moves a line of cans to said elevating means in a direction of travel opposite to the direction of travel of the upper span of the belt, and escapement means for releasing containers one at a time from a supply line to said elevating means.

18. Apparatus as set forth in claim 16, which further includes a container take-off device beneath the upper span of the belt which removes filled containers, and means for removing a container from said container lowering means and transferring it to said take-off device.

References Cited by the Examiner

UNITED STATES PATENTS

| | | | |
|---|---|---|---|
| 31,530 | 2/1861 | Cluxton | 222—370 X |
| 949,675 | 2/1910 | Crowley | 53—266 |
| 1,075,543 | 10/1913 | Ash | 141—74 |
| 1,828,864 | 10/1931 | Hopkins | 53—266 X |
| 2,066,040 | 12/1936 | Kee | 141—74 |
| 2,133,264 | 10/1938 | Wolff | 53—78 X |
| 2,381,505 | 8/1945 | Lindholm | 222—56 |
| 2,627,334 | 2/1953 | Koppel et al. | 198—31 |
| 2,720,109 | 10/1955 | Stirn et al. | 141—73 X |
| 3,125,134 | 3/1964 | Johnson | 141—176 X |

FOREIGN PATENTS 545,869  3/1956  Belgium.

LAVERNE D. GEIGER, *Primary Examiner.*

LEWIS J. DEMBO, *Examiner.*